United States Patent [19]

Bishop et al.

[11] Patent Number: 5,093,913
[45] Date of Patent: Mar. 3, 1992

[54] MULTIPROCESSOR MEMORY MANAGEMENT SYSTEM WITH THE FLEXIBLE FEATURES OF A TIGHTLY-COUPLED SYSTEM IN A NON-SHARED MEMORY SYSTEM

[75] Inventors: Thomas P. Bishop, Aurora; Mark H. Davis, Warrenville; Robert W. Fish, West Chicago; James S. Peterson, Aurora; Grover T. Surratt, West Chicago, all of Ill.

[73] Assignee: AT&T Laboratories, Murray Hill, N.J.

[21] Appl. No.: 279,637

[22] Filed: Dec. 5, 1988

Related U.S. Application Data

[62] Division of Ser. No. 941,703, Dec. 22, 1986, Pat. No. 4,811,216.

[51] Int. Cl.⁵ .................... G06F 12/00; G06F 15/16
[52] U.S. Cl. ............................. 395/650; 364/228.7; 364/228.8; 364/230; 364/230.3; 364/245.5; 364/245.7; 364/280; 364/280.6; 364/281.6
[58] Field of Search ... 364/200 MS File, 900 MS File

[56] References Cited

U.S. PATENT DOCUMENTS

| 4,253,146 | 2/1981 | Bellamy et al. | 364/200 |
|---|---|---|---|
| 4,384,323 | 5/1983 | Ahuja | 364/200 |
| 4,511,964 | 4/1985 | Georg et al. | 364/200 |
| 4,514,728 | 4/1985 | Ahuja | 340/825.5 |
| 4,633,392 | 12/1986 | Vincent et al. | 364/200 |
| 4,685,125 | 8/1987 | Zave | 379/96 |
| 4,754,394 | 6/1988 | Brantley, Jr. et al. | 364/200 |
| 4,811,216 | 3/1989 | Bishop et al. | 364/200 |
| 4,925,311 | 5/1990 | Neches et al. | 364/200 |

FOREIGN PATENT DOCUMENTS 1184310 3/1985 Canada ........................... 354/233

OTHER PUBLICATIONS

P. Jackson, "UNIX Variant Opens a Path to Managing Multiprocessor Systems", Electronics, Jul. 28, 1983, pp. 118-124.

K. Christian, The UNIX Operating System, J. Wiley & Sons, 1983, pp. 183-199 and 236-258.

P. J. Brown, Writing Interactive Compilers and Interpreters, J. Wiley & Sons, 1981, pp. 75-80.

B. J. Nelson, Remote Procedure Call, Carnegie-Mellon University Dissertation, Report No. CMU-CS-81-119.

S. R. Ahuja, "S/NET: A High-Speed Interconnect for Multiple Computers," IEEE Journal on Selected Areas in Communications, vol. SAC-1, No. 5, (11-83) pp. 751-756.

J. M. Tobias, "A Single User Multiprocessor Incorporating Processor Manipulation Facilities", The 7th Annual Symposium on Computer Architecture, May 6-8, 1980, pp. 131-138.

P. Emrath, "Xylem: An Operating System for the Cedar Multiprocessor", IEEE Software, vol. 2, No. 4 (Jul. 1985), pp. 30-37.

Primary Examiner—Gareth D. Shaw
Assistant Examiner—Paul Kulik
Attorney, Agent, or Firm—David Volejnicek

[57] ABSTRACT

In a multiprocessor system (FIG. 1) wherein each adjunct processor has its own, non-shared, memory (22) the non-shared memory of each adjunct processor (11-12) comprises global memory (42) and local memory (41). All global memory of all adjunct processors is managed by a single process manager (30) of a system-wide host processor (10). Each processor's local memory is managed by its operating system kernel (31). Local memory comprises uncommitted memory (45) not allocated to any process and committed memory (46) allocated to processes. The process manager assigns processes to processors and satisfies their initial memory requirements through global memory allocations. Each kernel satisfies processes' dynamic memory allocation requests from uncommitted memory, and deallocates to uncommitted memory both memory that is dynamically requested to be deallocated and memory of terminating processes. Each processor's kernel and the process manager cooperate to transfer memory between global memory and uncommitted memory to keep the amount of uncommitted memory within a predetermined range.

21 Claims, 8 Drawing Sheets

MEMORY STATE DIAGRAM
FIG. 4

MULTIPROCESSOR MEMORY MANAGEMENT SYSTEM WITH THE FLEXIBLE FEATURES OF A TIGHTLY-COUPLED SYSTEM IN A NON-SHARED MEMORY SYSTEM

CROSS REFERENCE TO A RELATED APPLICATION

This is a division of application Ser. No. 941,703, filed Dec. 22, 1986, now issued as U.S. Pat. No. 4,811,216.

TECHNICAL FIELD

This invention concerns allocation of memory to processes in a multiprocessor system comprising a plurality of processors each having its own memory.

BACKGROUND OF THE INVENTION

Multiprocessor computers are generally classified as being either "tightly-coupled" or "loosely-coupled", according to the memory arrangement which they use.

Tightly-coupled systems are shared-memory systems wherein a plurality of processors typically have no memory dedicated to their own use (other than cache memory) and share use of a centrally-administered memory. Central administration by a single control entity avoids the difficulty of coordinating the work of a plurality of control entities, and enables the central entity to manage the memory without conflict and easily to keep track of the status of every portion of that memory. Hence, memory management—including the allocation of memory storage space to processes—is easily implementable and may be made rather flexible. On the other hand, centralized memory management is a "bottleneck" that may restrict the performance of the multiprocessor. The central control entity also adversely affects the fault-tolerance of the multiprocessor, because it is a single point whose failure will generally incapacitate the whole system.

Loosely-coupled systems are non-shared memory systems wherein each processor has its own memory substantially dedicated to its own use and administered locally, i.e., by that processor's own control entity. Because each memory is locally administered by a different control entity that has no knowledge of, and no control over, memory of any other processor, extensive coordination and cooperation between the various processors is required for unified, system-wide, memory management. To avoid conflict between the plural control entities, assignment of processes to processors is generally predetermined and static, i.e., unvarying, and allocation of memory to processes is complex and rigidly limited.

An unsolved problem in the art, therefore, is how to provide flexible and dynamic memory management, akin to that available in tightly-coupled multiprocessor systems, in non-shared memory multiprocessor systems.

SUMMARY OF THE INVENTION

This invention is directed to solving this and other problems and disadvantages of the prior art. According to the invention, in a multiprocessor system that includes a plurality of processors each one of which has its own memory, each processor's memory is logically divided into a first and a second portion, referred to as a global and a local portion. A first control arrangement of the multiprocessor allocates to processes memory included in the first memory portions. Illustratively, the first control arrangement includes a process manager located on one of the processors, whose functions include assignment of processes to processors. A plurality of second control arrangements, a different one of which is associated with each processor, each allocate to processes memory included in the second memory portion of the associated processor. Illustratively, each second control arrangement includes an operating system kernel whose capabilities include conventional memory management functions. The kernel both allocates local memory to, and deallocates local memory from, processes assigned to its associated processor.

The invention has the desirable memory administration features of both the tightly-coupled and the loosely-coupled multiprocessor systems. On one hand, the global memory portions are administered in the manner of a tightly-coupled multiprocessor system, making centralized memory management functions, such as process-to-processor assignment and allocation of initially-required memory to newly-created processes, flexible and easily implementable. Since these functions are centralized in a single control entity, there is no need to coordinate the activities of a plurality of control entities as in loosely-coupled systems. On the other hand, the local memory portions are administered in the manner of a loosely-coupled system. Because local memory administration pertains to intra-processor functions, such as allocation of memory to, and deallocation of memory from, processes assigned to the one processor, there is no need for coordinating the activities of a plurality of control entities with respect to these functions. Rather, each processor retains autonomous local control over its local memory. And because control of local memory is decentralized, there is no control bottleneck that may hamper the performance of the multiprocessor, or create a single point of failure for memory administration functions other than processor-to-processor assignment.

Preferably, the first control arrangement and the plurality of second control arrangements cooperate with each other to selectively transfer memory between the first and the second portion of memory of any processor. The transfers are made in response to occurrence of predetermined conditions. For example, storage space is transferred from the global portion to the local portion when the amount of memory in the local portion that is not allocated to processes subceeds—falls below—a predetermined minimum, and memory is transferred from the unallocated local portion to the global portion when the amount of memory in the unallocated local portion exceeds a predetermined maximum. The size of the local and global memory portions is therefore not static, but may be dynamically varied to meet system needs. Because the local portion can "borrow" storage space from the global portion and supply excess storage space back to the global portion, memory is more efficiently utilized—and hence may be made smaller—than would be the case in a similar but statically-partitioned system.

In one illustrative embodiment of the invention, the first control arrangement does not allocate memory to processes directly, but does so through the secondary control arrangements. The first control arrangement selects a processor for a process, among others on the basis of whether the processor has sufficient global memory to satisfy the process' initial memory requirements. The first control arrangement then transfers the required amount of memory from the global memory portion to the uncommitted local memory portion of the selected processor. The second control arrangement of the selected processor then allocates the required memory from the uncommitted local memory portion to the process.

This embodiment has the advantage that the first control arrangement is freed of most memory management functions and the record-keeping that accompanies them. For example, the first control arrangement need not keep records about how much, or which particular parts, of memory are allocated to processes, or even which particular parts of memory comprise the global portion. The first control arrangement only needs to know the amount of memory—illustratively the number of pages—that are within the global memory portion of each processor, as this is the only factor on which the centralized memory management functions depend. Structure of the process manager is thus simplified and its performance is improved.

These and other advantages and features of the present invention will become apparent from the following description of an illustrative embodiment of the invention taken together with the drawing.

DETAILED DESCRIPTION

Figure 1:
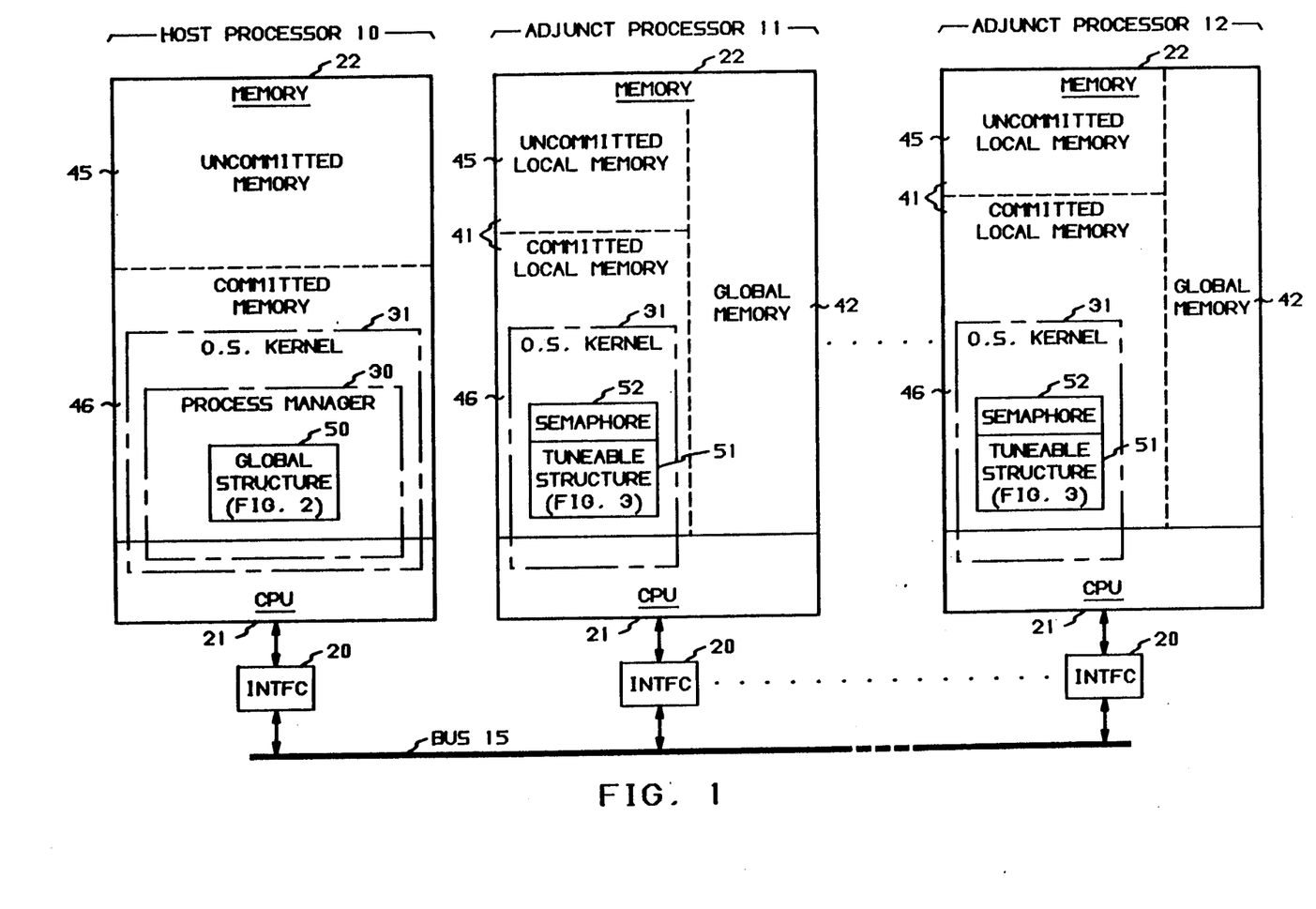
FIG. 1 is a block diagram of an illustrative multiprocessor system including an exemplary embodiment of the invention.

FIG. 1 shows a multiprocessor computing system comprising a plurality of processors 10-12 interconnected for communication by a communication medium such as a bus 15. Each processor includes at least three functional units: an interface 20 which enables the processor to communicate across bus 15 according to the protocol of bus 15, a central processing unit (CPU) 21 for executing processes including application and control processes, and a memory 22 which provides storage space for storing programs, data, and other information for use by processes assigned to the processor. For ease of reference, storage space within a memory will generally henceforth be referred to as memory.

Processors 10-12 include a host processor 10, which serves as the administrative and control center for the overall system of FIG. 1. Illustratively, host processor 10 is the 3B15 computer of AT&T-Information Systems Inc. Processors 10-12 also include a plurality of adjunct processors 11-12 each of which performs system functions specified by host processor 10. Illustratively, processors 11-12 each comprise a member of the WE® 32100 family of microprocessors of AT&T, with attached memory. Bus 15 is, in this example, a high-speed packet bus, such as a version of the S/NET bus described in an article by S. R. Ahuja entitled "S/NET: A High-Speed Interconnect for Multiple Computers" in *IEEE Journal on Selected Areas of Communications,* Vol. SAC-1, No. 5 (Nov. 1983), and in U.S. Pat. Nos. 4,384,323 and 4,514,728 to Ahuja.

The system of FIG. 1 operates under control of an operating system, illustratively a version of the UNIX® operating system of AT&T. The operating system is distributed across the processors 10-12. Distributed operating systems are known in the art. For example, an adaptation of the UNIX operating system to multiprocessors is described in an article by P. Jackson entitled "UNIX Variant Opens a Path to Managing Multiprocessor Systems," in *Electronics,* (July 28, 1983), pages 118-124. Program code of the operating system kernel 31 (the memory-resident portion of the operating system) is stored in memories 22 and executes as a series of processes on CPUs 21. Other portions of the operating system are stored on disk (not shown) that is illustratively attached to host processor 10 or one of processors 11-12 acting as a file server, and are brought into memory 22 of processor 10-12 when needed. Kernel 31 is replicated on each processor 10-12 and provides each processor 10-12 with the same basic operating system services. Kernel 31 of each processor 10-12 may additionally provide unique services for its processor. Included among the capabilities replicated on each processor 10-12 are memory management functions that perform allocation and deallocation of memory to/from processes assigned to the same one of the processors 10-12 on which the memory management function resides.

Further included in the operating system kernel is a process (or a collection of processes) referred to as a process manager 30. Process manager 30 is not replicated; it is located on host processor 10 only. Process manager 30 is a centralized control arrangement whose functions include the assignment of processes for execution to various ones of processors 10-12.

Memory is considered to be a local resource within the system of FIG. 1. That is, memory 22 of a processor 10-12 is allocated and deallocated to processes locally at each processor 10-12, by that processor's kernel 31 which has substantially no knowledge of, or control over, memory 22 of any other processor 10-12. However, processes are assigned for execution to processors 10-12 by process manager 30, which must know how much memory is available for initial assignment to processes on each processor 10-12, so that it can determine whether a particular processor 10-12 is capable of executing a given process.

For this reason, memory management is implemented in the system of FIG. 1 as follows. Memory 22 of each adjunct processor 11-12 is logically divided into two portions: local memory 41 and global memory 42. Local memories 41 together form a local memory pool, while global memories 42 together form a global memory pool. Local memories 41 of the local pool are managed by kernels 31 each one of which administers the local memory 41 of its associated processor, while the global pool is administered by process manager 30 in coordination with kernels 31. Since process manager 30 administers the global pool, it always knows the size of global memories 42 thereof. Process manager 30 uses this information to decide whether a processor 10-12 has sufficient memory available for allocation to processes to support assignment of any particular process thereto. Process manager 30 directly administers all memory 22 of host processor 10, using memory management functions of kernel 31 of processor 10 to do so. Process manager 30 administers memory 22 of host processor 10 in a conventional, uniprocessor, manner. It effectively views all memory 22 of processor 10 in the same manner as it views global memory of other processors.

Memory of each processor 10-12 is also logically divided into committed memory 46 and uncommitted memory 45. Uncommitted memory 45 is memory that has not been allocated for use to any process and is, therefore, free and available for allocation. Committed memory 46 is memory that has been allocated by a kernel 31 for use to a process and is therefore considered to be in use and unavailable for allocation. On adjunct processors 11-12, only local memory 41 may be committed. Global memory 42 is always uncommitted; this will be made clear further below.

To avoid disadvantages of static and inflexible memory partitioning, process manager 30 and kernels 31 of processors 11-12 may cooperatively transfer memory between local memory 41 and global memory 42 of a kernel's associated processor. Memory is thus allowed to "migrate" between local memory 41 and global memory 42, upon agreement between process manager 30 and kernel 31 of adjunct processor 11-12 to or from whose local portion 41 the memory is migrating.

Figure 4:
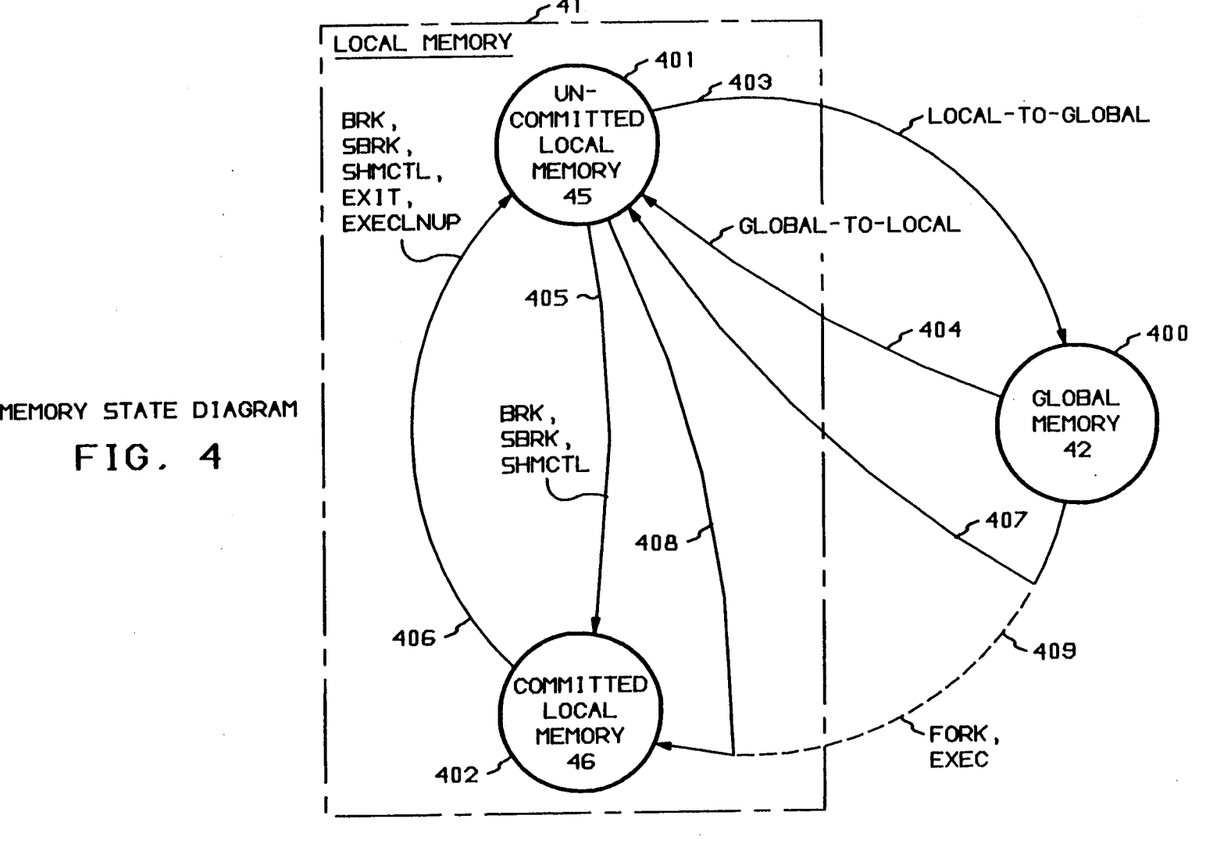
FIG. 4 is a state transition diagram of memory of the system of FIG. 1.

Memory migration is graphically illustrated by FIG. 4. FIG. 4 shows that any portion—illustratively any page—of memory 22 of an adjunct processor 11-12 is capable of being in any one of three states: allocated to global memory state 400, allocated to uncommitted local memory state 401, and allocated to committed local memory state 402. The occurrence of various predetermined conditions, described further below and represented in FIG. 4 by state transitions 403-409, cause memory to migrate from state to state.

Process manager 30 keeps track of the global memory pool by means of global structure 50. Structure 50 is shown in greater detail in FIG. 2. Structure 50 is a data structure—illustratively shown in FIG. 2 as a table—stored in memory 22 of processor 10. Structure 50 includes a plurality of entries 211-213 each one of which corresponds to a different one of processors 10-12, respectively. Each entry stores information indicating the amount of memory included in global memory 42 of the associated processor. UNCOMMITTED CT. entry 211 associated with host processor 10 stores information indicating the amount of storage space included in unallocated memory 45 of processor 10.

Figure 2:
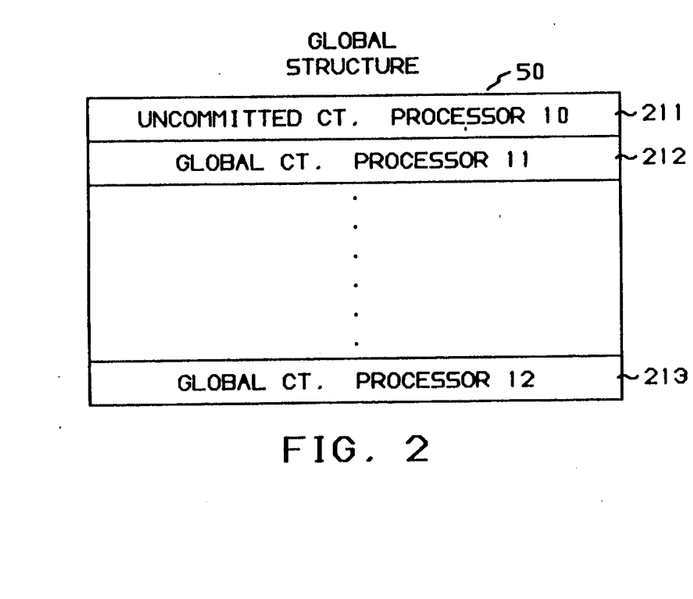
FIG. 2 is a block diagram of the global structure of the host processor of FIG. 1.

Illustratively, memory 22 of each processor 10-12 is logically partitioned into pages—each one being 2048 bytes in size, for example—and each GLOBAL CT. entry 211-213 stores a count of the number of pages of memory included in unallocated memory 45 (entry 211) or in corresponding global memory 42 (entries 212-213). No particular pages are associated with the count, and the memory manager 30 does not care about the identity of pages—it cares only about numbers of pages. Hence, no information identifying any particular pages need be stored in entries 211-213 of global structure 50.

Figure 3:
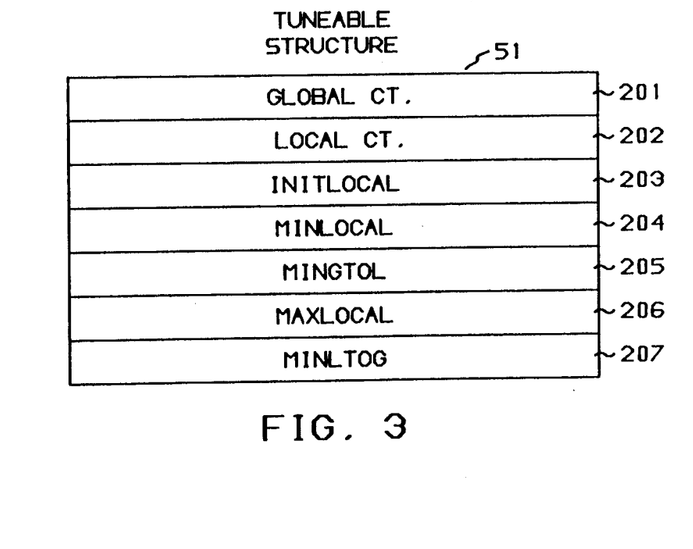
FIG. 3 is a block diagram of the tunable structure of an adjunct processor of FIG. 1.

Each adjunct kernel 31 manages its corresponding local memory 41 substantially in a conventional manner. However, for purposes of efficient administration of the division of associated memory 22 into local memory 41 and global memory 42, each kernel 31 has its own tunable structure 51. An illustrative tunable structure 51 is shown in FIG. 3. Structure 51 is a data structure—illustratively shown in FIG. 3 as a table—stored in memory 22 of processors 11-12 on which kernels 31 reside. Structure 51 includes a plurality of entries 201-207 all pertaining to the memory 22 of the one adjunct processor on which it is located. GLOBAL CT. entry 201 stores information indicating the amount of memory included in global memory 42. This memory is represented by state 400 in FIG. 4. LOCAL CT. entry 202 stores information indicating the amount of memory included in uncommitted local memory 45. This memory is represented by state 401 in FIG. 4. INITLOCAL entry 203 stores information indicating the amount of memory to be included in unallocated local memory 45 upon initialization of the processor; remaining unallocated memory is included upon initialization in global memory 42. MINLOCAL entry 204 stores information indicating the minimum amount of memory that uncommitted local memory 45 should desirably contain. If and when the amount of memory in uncommitted local memory 45 subceeds the minimum specified by entry 204, kernel 31 attempts to have additional storage space migrate to uncommitted local memory 45 from global memory 42. This migration is represented by state transition 404. MINGTOL entry 205 stores information indicating the minimum amount of memory that should desirably be migrated at any one time from global memory 42 to local memory 41, to avoid "thrashing". Less memory than the minimum specified by entry 205 is migrated generally only when global memory 42 contains less memory than that minimum. MAXLOCAL entry 206 stores information indicating the maximum amount of memory that uncommitted local memory 45 should desirably contain. If and when the amount of memory in uncommitted local memory 45 exceeds the maximum specified by entry 206, kernel 31 migrates, with approval of memory manager 30, some of that memory from local memory 41 to global memory 42. This migration is represented in FIG. 4 by state transition 403. MINLTOG entry 207 stores information indicating the minimum amount of memory that should desirably be migrated at any one time from uncommitted local memory 45 to global memory 42, to avoid "thrashing". Less memory than the minimum specified by entry 207 is migrated generally only when migration of that much memory would reduce the amount of memory in uncommitted local memory 45 below the minimum specified by entry 204.

Certain relationships exist among entries 203-207, as follows. The amount of memory indicated by MAXLOCAL entry 206 is greater than the amount of memory indicated by MINLOCAL entry 204. The amount of memory indicated by INITLOCAL entry 203 is bounded by the amounts of memory indicated by MAXLOCAL entry 206 and MINLOCAL entry 203. The difference between the amounts of memory indicated by MAXLOCAL entry 206 and MINLOCAL entry 203 is equal to or greater than the amount of memory indicated by MINGTOL entry 205 and by MINLTOG entry 207. And preferably, the amounts of memory indicated by MINLTOG entry 207 and by MINGTOL entry 205 are not equal to each other.

Illustratively, if memory 22 is logically partitioned into pages, each entry 201-207 stores a count of some number of pages; no information identifying particular pages need be stored in tunable structure 51. In one illustrative embodiment of the system of FIG. 1, wherein each memory 22 of processors 11-12 has one or two thousand pages of storage space and wherein the operating system kernel occupies approximately 200 to 500 pages of each memory 22, entry 203 indicates 5 pages, entry 204 indicates 5 pages, entry 205 indicates 40 pages, entry 206 indicates 75 pages, and entry 207 indicates 50 pages.

The UNIX operating system includes three process creation and termination primitives, which require allocation and deallocation of memory to/from processes.

A FORK primitive duplicates an existing process. The parent and child processes are identical in program—they share the text portion of memory allocated to them. However, each duplicated process has its own data portion in memory, so the processes can execute independently of each other.

An EXEC primitive transforms an existing process into a different process, by causing the process issuing the EXEC primitive to stop executing its present program and to begin executing a specified new program. Hence, the old and the new process each must have its own text and data portions in memory. As part of the EXEC primitive call, generally there is specified the minimum amount of memory that must initially be allocated to the transformed, new, process. An illustrative implementation of the EXEC primitive in a multiprocessor system is described in application of T. P. Bishop et al. entitled "Virtual Execution of Programs on a Multiprocessor System", filed on even date herewith and assigned to the same assignee as this application.

Generally, one process creates a new process by means of execution of the FORK primitive, immediately followed by execution of the EXEC primitive on the child process.

An EXIT primitive terminates a process and releases—deallocates—its allocated memory. The EXIT primitive releases both the text and the data portions of a process not sharing the text memory portion with another process; it releases only the data memory portion of a process sharing the text memory portion with another process.

Additionally, the UNIX operating system includes four system calls by means of which an existing process can dynamically, i.e., during its execution, request that either additional memory be allocated thereto, or that some of the memory allocated thereto be deallocated. These system calls are BRK, SBRK, SHMCTL, and an EXECLNUP portion of the EXEC system call. Arguments accompanying the first three system calls specify whether memory allocation or deallocation is being requested (EXECLNUP only deallocates memory), and the amount of memory being requested. The BRK and SBRK system calls are for memory dedicated to a process, while SHMCTL is a call for memory shared by a plurality of processes. EXECLNUP is a call for deallocation of memory of an old process that has been successfully transformed into a new process.

The activities relevant to this invention that are undertaken by memory manager 30 and kernels 31 in response to the above-described primitives and system calls are diagramed in FIGS. 5-9.

Figure 5:
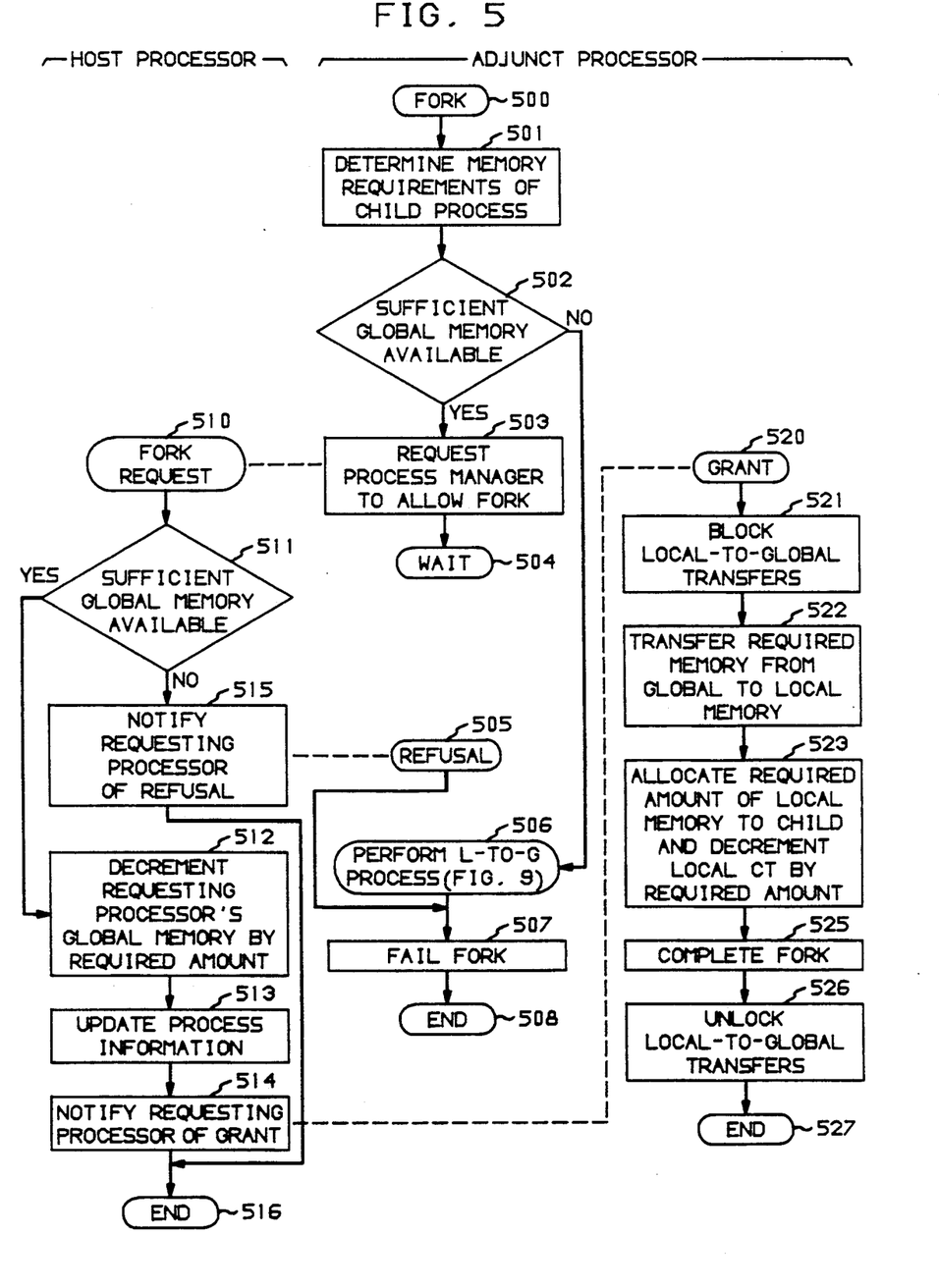
FIG. 5 is a flow diagram of the operation of the system of FIG. 1 in response to a FORK call.

FIG. 5 shows the system response to a FORK call. Since the parent and child processes will share a common text memory portion, they will be co-located on the same processor 10-12 on which the parent process is currently located. Hence, no choice of process-to-processor assignment is required.

For purposes of illustration, assume that the FORK primitive is called by a process on adjunct processor 11. In response to the FORK call, at step 500, kernel 31 of processor 11 determines the memory requirements of the child process, at step 501. Kernel 31 knows the amount of memory being used by any process on processor 11, and the child process is merely a copy of the parent. Hence, kernel 31 determines the memory requirements of the child from those of the parent. Next, at step 502, kernel 31 of processor 11 examines entry 201 of its tunable structure 51 to determine whether there is sufficient memory available in global memory 42 to satisfy that memory requirement. Illustratively, it does so by comparing the memory requirement of the child process with global count entry 201 of its tunable structure 51 to determine whether global memory 42 includes the amount of memory required by the child process. If sufficient global memory 42 is not available—the child process' memory requirement exceeds entry 201—kernel 31 proceeds to step 506.

If kernel 31 determines at step 502 that sufficient global memory is not available for the process to FORK, kernel 31 fails the FORK, at step 507. The activities undertaken by kernel 31 at step 507 are conventional. But before failing the FORK, kernel 31 performs the local-to-global memory transfer function of FIG. 9 to transfer an amount of memory from uncommitted local memory 45 to global memory 42, at step 506. This transfer is represented by state transition 403 in FIG. 4. Kernel 31 does so in anticipation of the failed FORK being attempted again in the very near future, and tries to ensure thereby that the next FORK attempt will not fail due to lack of sufficient global memory 42. After failing the FORK at step 507, involvement of kernel 31 in the FORK comes to an end, at step 508.

If kernel 31 determines at step 502 that sufficient global memory is available for the process to FORK, kernel 31 requests host processor 10 to allow the parent process to FORK, at step 503. Illustratively, kernel 31 does so by causing a packet carrying information to that effect to be sent over bus 15 to process manager 30. The transferred information includes the memory requirement of the child process. Kernel 31 then awaits a response from process manager 30, at step 504.

The communication between processor 11 and processor 10 is kernel synchronous: processor 11 cannot dispatch any new process until processor 10 answers the request. It is logically a remote subroutine call. While requesting kernel 31 waits, it can handle local interrupts and also remote requests that it may receive, but no other process can be dispatched.

Process manager 30 responds to receipt of the FORK request, at step 510, by examining entry 212 of global structure 50 that corresponds to adjunct processor 11 to determine whether there is sufficient memory available in global memory 42 of adjunct processor 11, at step 511. Process manager 30 must do this because entry 212 of global structure 50 and entry 201 of tunable structure 51 of adjunct processor 11 are maintained by separate control mechanisms 30 and 31 and hence may at certain times be out of synch and not have identical contents.

If process manager 30 determines at step 511 that sufficient global memory is not available, it notifies adjunct processor 11 of its refusal to allow the FORK, at step 515. Process manager 30 does this illustratively by causing a packet having information to this effect to be sent to processor 11 over bus 15. Involvement of process manager 30 in the FORK thus ends, at step 516.

In response to receipt at step 505 of the refusal to allow the FORK, kernel 31 fails the FORK, at step 507, and ends its involvement in the FORK, at step 508.

If sufficient global memory is found to be available on processor 11, at step 511, process manager 30 decrements entry 212 of global structure 50 by the amount of requested memory, at step 512, thereby initiating migration of that amount of global memory 42 of processor 11 to local memory 41 of processor 11. This migration is represented in FIG. 4 by state transition 407. Process manager 30 then updates information that it keeps on all processes within the system of FIG. 1 to include the child process, at step 513. The activities undertaken by process manager 30 at step 513 are substantially conventional, but also include storing of information regarding which processor 10-12 the child process is located on. Process manager 30 then notifies adjunct processor 11 of grant of the FORK request, at step 514. Illustratively, process manager 30 does so by causing a packet carrying information to that effect to be transmitted to adjunct processor 11 over bus 15. Involvement of process manager 30 in allocating memory to the child process is thus ended, at step 516.

Kernel 31 of processor 11 responds to receipt of notice of the FORK grant, at step 520, by initially blocking local-to-global (L-to-G) memory transfers from being made, at step 521. The transfers are blocked by means of incrementing a count semaphore 52 (see FIG. 1) associated with tunable structure 51 of processor 11 and located on processor 11. Count semaphores are well known in the art. Kernel 31 then transfers the amount of memory required by the child process from global memory 42 to uncommitted local memory 45, at step 522, to complete the migration represented in FIG. 4 by state transition 407. Kernel 31 accomplishes the transfer by decrementing entry 201 of its tunable structure 51 by the amount of requested memory, and incrementing entry 202 by the same amount.

LOCAL CT. entry 202 of structure 51 may now exceed MAXLOCAL entry 206 of structure 51. This result would generally trigger a migration, represented in FIG. 4 by state transition 403, of some of uncommitted local memory 46 to global memory 42. It was for the purpose of preventing this migration from occurring that kernel 31 blocked local-to-global memory transfers at step 521.

Following the memory transfer at step 522, kernel 31 allocates the requested amount of uncommitted local memory 45 to the child process, in a conventional manner, and decrements entry 202 of its tunable structure 51 to reflect this fact, at step 523.

This allocation migrates the allocated memory from uncommitted local memory 45 to committed local memory 46. This migration is represented in FIG. 4 by state transition 408. The net result of the FORK on memory 22 of processor 11 thus is the migration of the required amount of memory from global memory 42 to committed local memory 46. This net migration is indicated in FIG. 4 by state pseudo-transition 409, which represents the net effect of state transitions 407 and 408.

Kernel 31 completes the FORK, at step 525, in a conventional manner. Activities performed by kernel 31 at step 525 include updating of records that indicate which processes are assigned to processor 11, updating of records that indicate what memory is assigned to what process, and notifying the other processes affected by the FORK, including the parent process, of the success of the FORK. This being done, kernel 31 unblocks local-to-global memory transfers, at step 526, by decrementing counting semaphore 52. Involvement of kernel 31 in the FORK is thus ended, at step 527.

Figure 6:
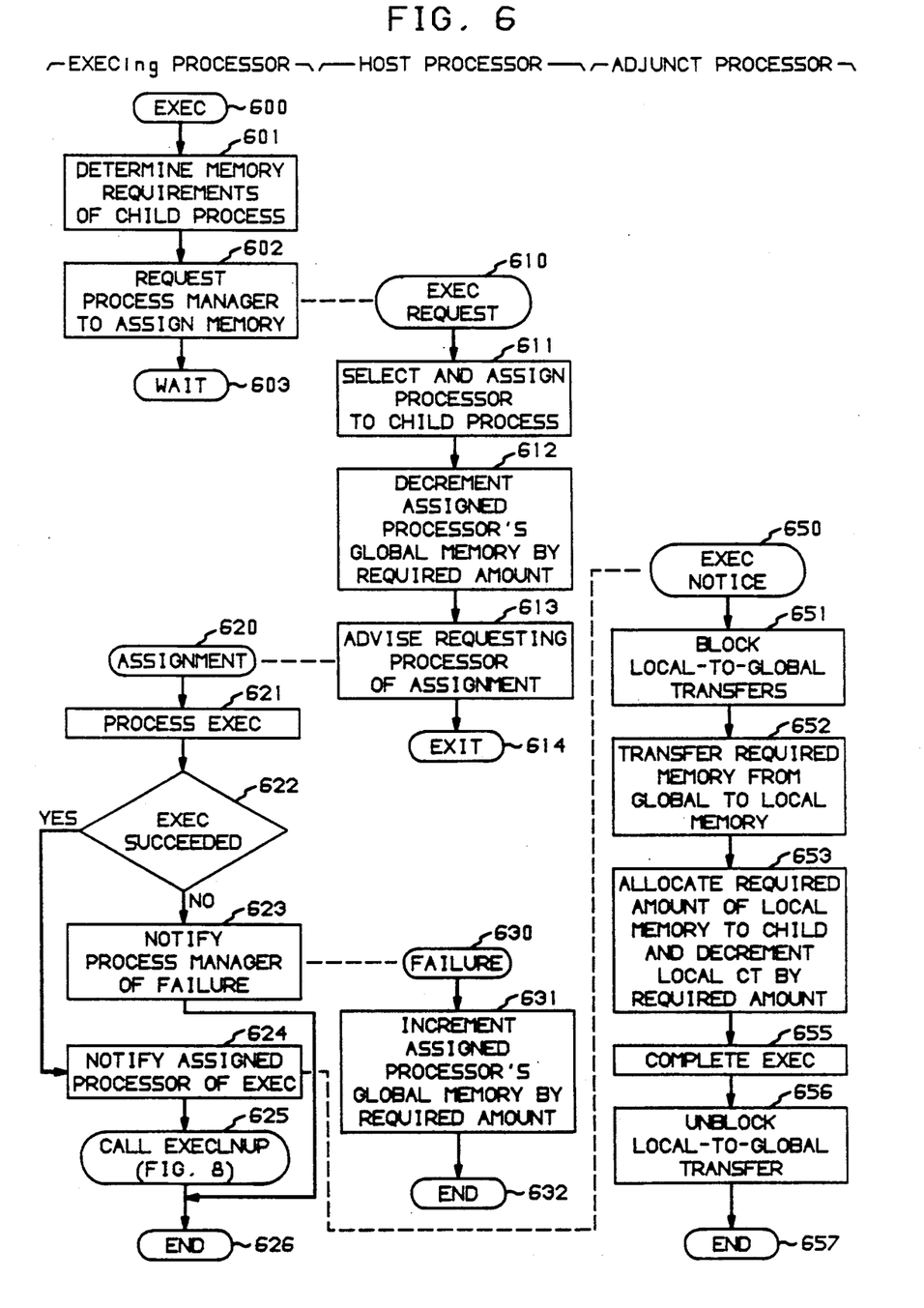
FIG. 6 is a flow diagram of the operation of the system of FIG. 1 in response to an EXEC call.

FIG. 6 shows the system response to an EXEC call. The transformed process, referred to as the new process, may end up being located on either the same processor 10-12 or on a different processor 10-12 than the original process, referred to as the old process. A choice of process-to-processor assignment is therefore required, and must be made by process manager 30. If the new process is not assigned by process manager 30 to the old process' processor, no memory need be allocated on the old process' processor as a consequence of the EXEC; only the old process' memory need be deallocated.

For purposes of illustration, assume that the EXEC primitive is called by a process on processor 12. In response to the EXEC call, at step 600, kernel 31 of processor 12 determines the memory requirements of the new process, at step 601 As was indicated above, the new process' initial memory requirements are specified directly by the EXEC call, for example. Alternatively, the memory requirements are specified in an object file that is to be EXEC'd, and are picked up therefrom by kernel 31 Next, kernel 31 of processor 12 requests process manager 30 to assign memory of a processor to the new process, at step 602. Illustratively, kernel 31 does so by causing a packet having information about the EXEC, including initial memory requirements of the new process, to be sent to host processor 10. Kernel 31 of processor 12 then awaits response from process manager 30, at step 603. Once again, the communication between processor 12 and processor 10 is kernel synchronous.

Process manager 30 responds to receipt of the EXEC request, at step 610, by selecting a processor 10-12 for the new process to run on and assigning the new process thereto, at step 611. Process manager 30 bases the selection on any suitable criteria applicable to the particular configuration of the system of FIG. 1 and the use to which the system is being put. These criteria include, for example, which processor 10-12 has the computing capabilities and peripherals required by the new process, and the current load distribution of processes across processors 10-12.

One of the criteria used by process manager 30 is the availability of memory for assignment to the new process on a processor 10-12. If sufficient memory is not available to a process, the process usually cannot execute. Hence, as part of the process-to-processor assignment performed at step 611, process manager 30 compares the initial memory requirement of the new process with a processor's corresponding GLOBAL CT entry in global structure 50, and assigns the new process to that processor 10-12 only if and when global memory 42 available on that processor 10-12 at least equals the initial memory requirement of the new process.

For purposes of illustration, assume that processor 11 is selected at step 611. Following selection, process manager 30 decrements entry 212 of global structure 50 by the amount of initial memory requirement of the new process, at step 612, thereby initiating migration of that amount of global memory 42 of processor 11 to local memory 41 of processor 11. This migration is represented in FIG. 4 by state transition 407. Process manager 30 then notifies EXEC-requesting processor 12 of the assignment of processor 11 to the new process, at step 613, illustratively by causing a packet to be sent to processor 12 over bus 15. Barring occurrence of any difficulties with performance of the EXEC, involvement of process manager 30 therein is ended thereby, at step 614.

In response to the notice of assignment of processor 11 to the new process, at step 620, kernel 31 of processor 12 processes the EXEC, at step 621, substantially in a conventional manner. The further processing of the EXEC at step 621 leads to either success or failure of the EXEC, as suggested by step 622. If the EXEC fails, kernel 31 notifies process manager 30 of the failure, at step 623. Involvement of kernel 31 of processor 12 in the EXEC then ends, at step 626.

Process manager 30 responds to receipt of the EXEC failure notification, at step 630, by incrementing entry 212 of processor 11 by the initial memory requirement of the new process, at step 631, thereby restoring that memory to global memory portion 42 of processor 11 and terminating the migration represented in FIG. 4 by state transition 407. Involvement of process manager 30 in the EXEC thus ends, at step 632.

Since the EXEC failed, assigned processor 11 has not been actively involved in performing the EXEC.

Returning to step 622, if the EXEC succeeds, kernel 31 of processor 12 notifies kernel 31 of processor 11 of its assignment to the new process, at step 624. Illustratively, notification takes place by means of a packet being transmitted from processor 12 to processor 11 via bus 15. The packet contains information about the EXEC. Since the transformation was successful, the old process ceases to exist and hence its allocated memory must be deallocated. For this purpose, kernel 31 calls the EXECLNUP function of FIG. 8, at step 625. Involvement of kernel 31 of processor 12 in the EXEC then ends, at step 626.

Kernel 31 of processor 11 responds to being notified of the EXEC, at step 650, by initially blocking local-to-global memory transfers from being made, at step 651, by incrementing count semaphore 52. Kernel 31 then transfers the amount of memory required by the new process from global memory 42 to uncommitted local memory 45, at step 652, in the manner described for step 502. Kernel 31 thus completes the migration represented in FIG. 4 by state transition 407. Kernel 31 then allocates the requested amount of uncommitted local memory 45 to the new process, in a conventional manner, and decrements entry 202 of its tunable structure 51 to reflect this fact, at step 653.

This allocation migrates the allocated memory from uncommitted local memory 45 to committed local memory 46. This migration is represented in FIG. 4 by state transition 408. The net result of the EXEC on memory 22 of processor 11 thus is the migration of the required amount of memory from global memory 42 to committed local memory 46. This net migration is indicated in FIG. 4 by state pseudo-transition 409, which represents the net effect of state transitions 407 and 408.

Kernel 31 otherwise completes the EXEC, at step 655, in a conventional manner. Activities performed by kernel 31 at step 655 include those described for step 525. This being done, kernel 31 unblocks local-to-global memory transfers, at step 656, by decrementing counting semaphore 52. Involvement of kernel 31 in the EXEC is thus ended, at step 657.

Figure 7:
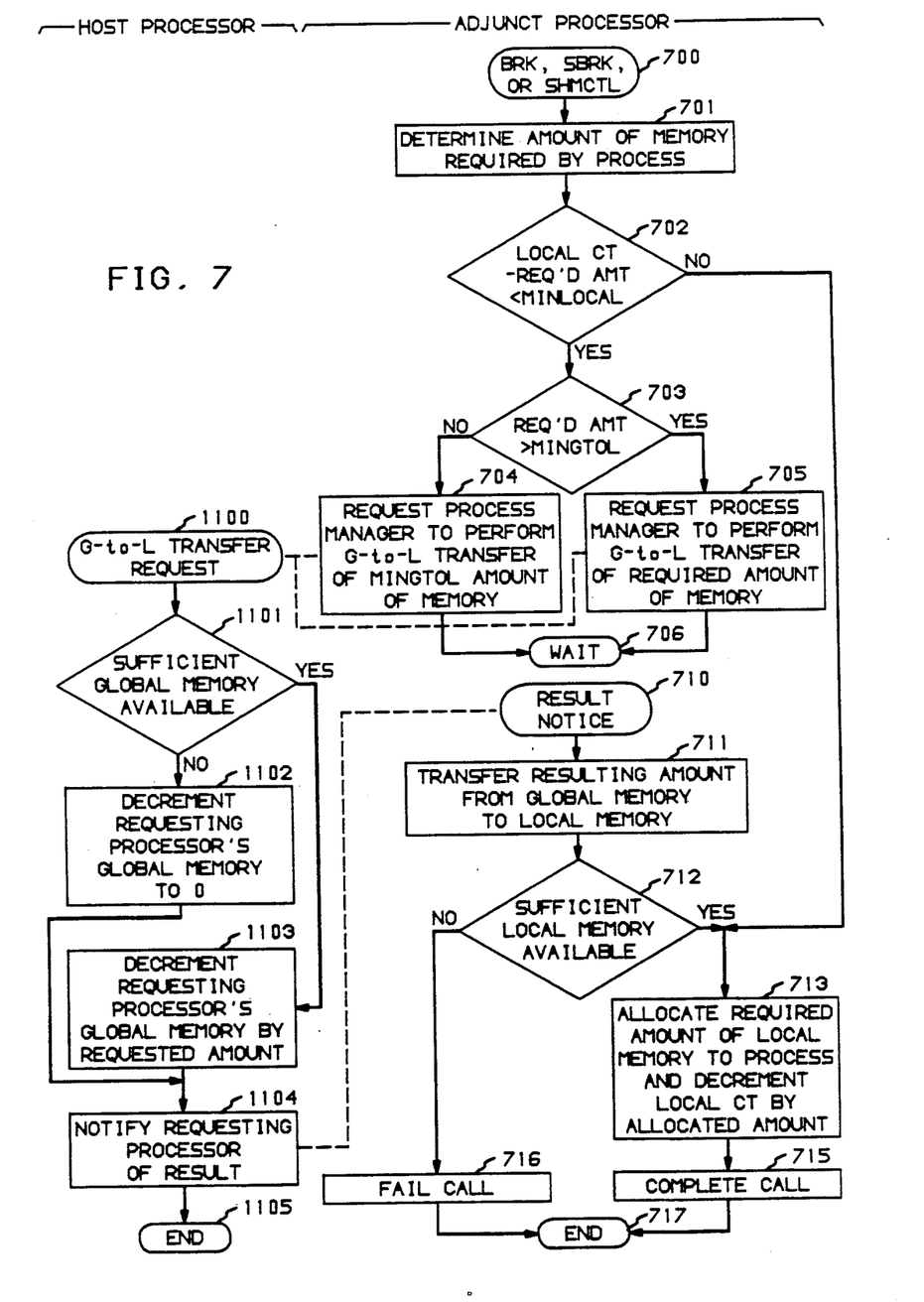
FIG. 7 is a flow diagram of the operation of the system of FIG. 1 in response to a dynamic memory allocation request.

FIG. 7 shows the system response to a system call by a process for dynamic allocation of memory. For purposes of this invention, this response is the same for the BRK, SBRK, and SHMCTL allocation calls. Since these calls comprise a request by a process assigned to and executing on a particular processor 10-12 for more memory on that one processor, no process-to-processor assignment is involved therein.

Assume that the call occurs on processor 11. In response to the allocation call, at step 700, kernel 31 of processor 11 determines the amount of memory being called for by the calling process, at step 701. Typically, the call will directly specify the required memory amount. Kernel 31 then examines LOCAL CT. entry 202 to determine whether uncommitted local memory 45 includes an amount of memory suitable to satisfy the call. Suitability may be determined on the basis of any desirable criteria, such as sufficiency of available memory. Illustratively, kernel 31 then compares the required amount against entries 202 and 204 of tunable structure 201, at step 702, to determine whether the required amount would reduce uncommitted local memory 45 below the MINLOCAL amount.

If so, kernel 31 compares the required amount against entry 205 of tunable structure 201 to determine whether the required amount exceeds the MINGTOL amount, at step 703. If the required amount does not exceed the MINGTOL amount, kernel 31 requests process manager 30 to transfer the MINGTOL amount of global memory 42 to local memory 41, at step 704. If the required amount does exceed the MINGTOL amount, kernel 31 requests process manager 30 to transfer the required amount of global memory 42 to local memory 41, at step 705. Illustratively, kernel 31 makes the request by causing a packet to that effect to be sent from processor 11 to processor 10 via bus 15. Kernel 31 then awaits response to the global-to-local transfer request from process manager 30, at step 706. Once again, the communication between processor 11 and processor 10 is kernel synchronous.

Process manager 30 responds to receipt of the global-to-local transfer request, at step 1100, by examining entry 212 of global structure 50 that corresponds to adjunct processor 11 to determine whether there is sufficient memory available in global memory 42 of adjunct processor 11 to satisfy the transfer request, at step 1101.

If process manager 30 determines at step 1101 that the requested amount of memory exceeds the amount of global memory 42, it decrements entry 212 of global structure 50 to zero, at step 1102, thereby initiating migration of all available global memory 42 of processor 11 to uncommitted local memory 45 of processor 11. This migration is represented in FIG. 4 by state transition 404.

If process manager 30 determines at step 1101 that the requested amount of memory does not exceed the amount of global memory 42, it decrements entry 212 of global structure 50 by the amount of requested memory, at step 1103, thereby initiating migration of that amount of global memory 42 of processor 11 to local memory 41 of processor 11. This migration is likewise represented in FIG. 4 by state transition 404.

Following decrementing of global memory 42 at step 1102 or 1103, process manager 30 notifies adjunct processor 11 of how much global memory 42 is being transferred to local memory 41, at step 1104. Process manager 30 illustratively does so by causing a packet carrying the information to be transmitted from processor 10 to processor 11 via bus 15. Involvement of process manager 30 in the global-to-local memory transfer thus ends, at step 1105.

Kernel 31 of processor 11 responds to receipt of the notice of result of the transfer request, at step 710, by transferring the indicated amount of memory from global memory 42 to uncommitted local memory 45, at step 711, to complete the migration represented in FIG. 4 by state transition 404. Kernel 31 accomplishes the transfer in the manner described for step 522.

Next, kernel 31 compares entry 202 of tunable structure 51 of processor 11 against the amount of memory required by the calling process to determine whether there is sufficient memory available in uncommitted local memory 45 to satisfy the requirement, at step 712.

If the required amount of memory exceeds the amount of uncommitted local memory 45, kernel 31 fails the allocation call, at step 716, in a conventional manner. Kernel 31 then ends its response to the memory allocation call, at step 717.

If the required amount of memory does not exceed the amount of uncommitted local memory 45 at step 712, kernel 31 allocates the requested amount of uncommitted local memory 45 to the process, in a conventional manner, and decrements entry 202 of its tunable structure 51 to reflect this fact, at step 713. This allocation migrates the allocated memory from uncommitted local memory 45 to committed local memory 46. This migration is represented in FIG. 4 by state transition 405.

Kernel 31 completes the BRK, SBRK, or SHMCTL call, at step 715, in a conventional manner. Involvement of kernel 31 in allocating memory to the calling process thus ends, at step 717.

If it is determined at step 702 that the required amount of memory would not reduce uncommitted local memory 45 below the MINLOCAL amount, kernel 31 proceeds to step 713 to perform the activities described above for steps 713, 715, and 717.

Figure 8:
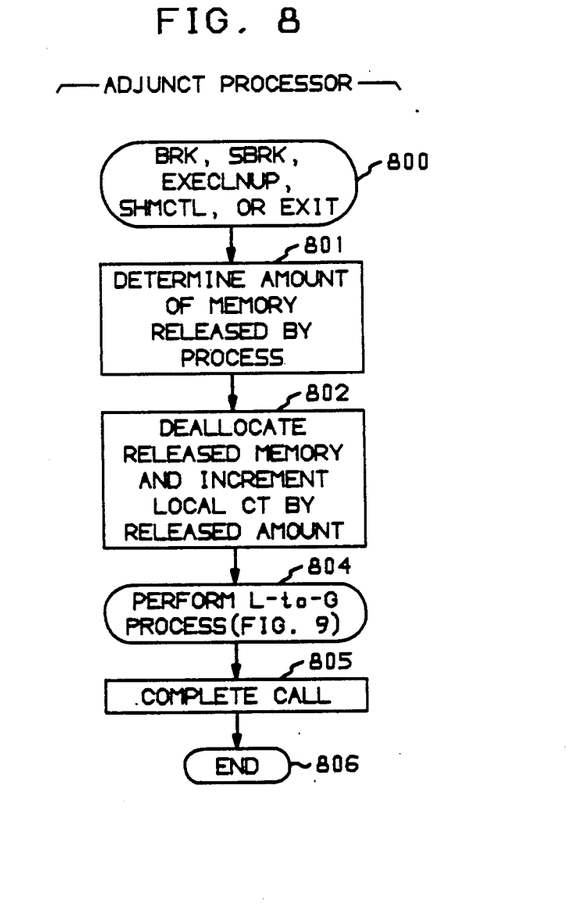
FIG. 8 is a flow diagram of the operation of the system of FIG. 1 in response to an EXIT system call or to a dynamic memory deallocation request.

FIG. 8 shows the system response to a system call by a process for the dynamic deallocation of memory, or to an EXIT primitive call, and to an EXECLNUP call. For purposes of this invention, this response is the same for the BRK, SBRK, SHMCTL, EXIT, and EXECLNUP calls. Since these calls comprise a request concerning a process assigned to a particular processor 10–12 to release some or all of the memory allocated to the process on that one processor, no process-to-processor assignment is involved therein.

Assume that the call occurs on processor 11. In response to the call, at step 800, kernel 31 of processor 11 determines the amount of memory being released, at step 801. Typically, a deallocation call will directly specify the amount of memory being released by the process. And in response to an EXIT or an EXECLNUP call, the kernel 31 is able to determine the amount of memory allocated to a process from information that it stores about that process and every other process assigned to processor 11. Kernel 31 then deallocates the released amount of committed local memory 46, in a conventional manner, and increments entry 202 of its tunable structure 51 to reflect this fact, at step 802. The deallocation migrates the released memory from committed local memory 46 to uncommitted local memory 45. This migration is represented in FIG. 4 by state transition 406.

Kernel 31 completes the BRK, SBRK, SHMCTL, EXIT, or EXECLNUP call, at step 805, in a conventional manner. Kernel 31 then performs the local-to-global transfer function of FIG. 9, at step 804, in order to transfer excess uncommitted local memory 45 to global memory 42. Kernel 31 otherwise completes the call, at step 805, in a conventional manner, and ends its involvement in the deallocation, at step 806.

Figure 9:
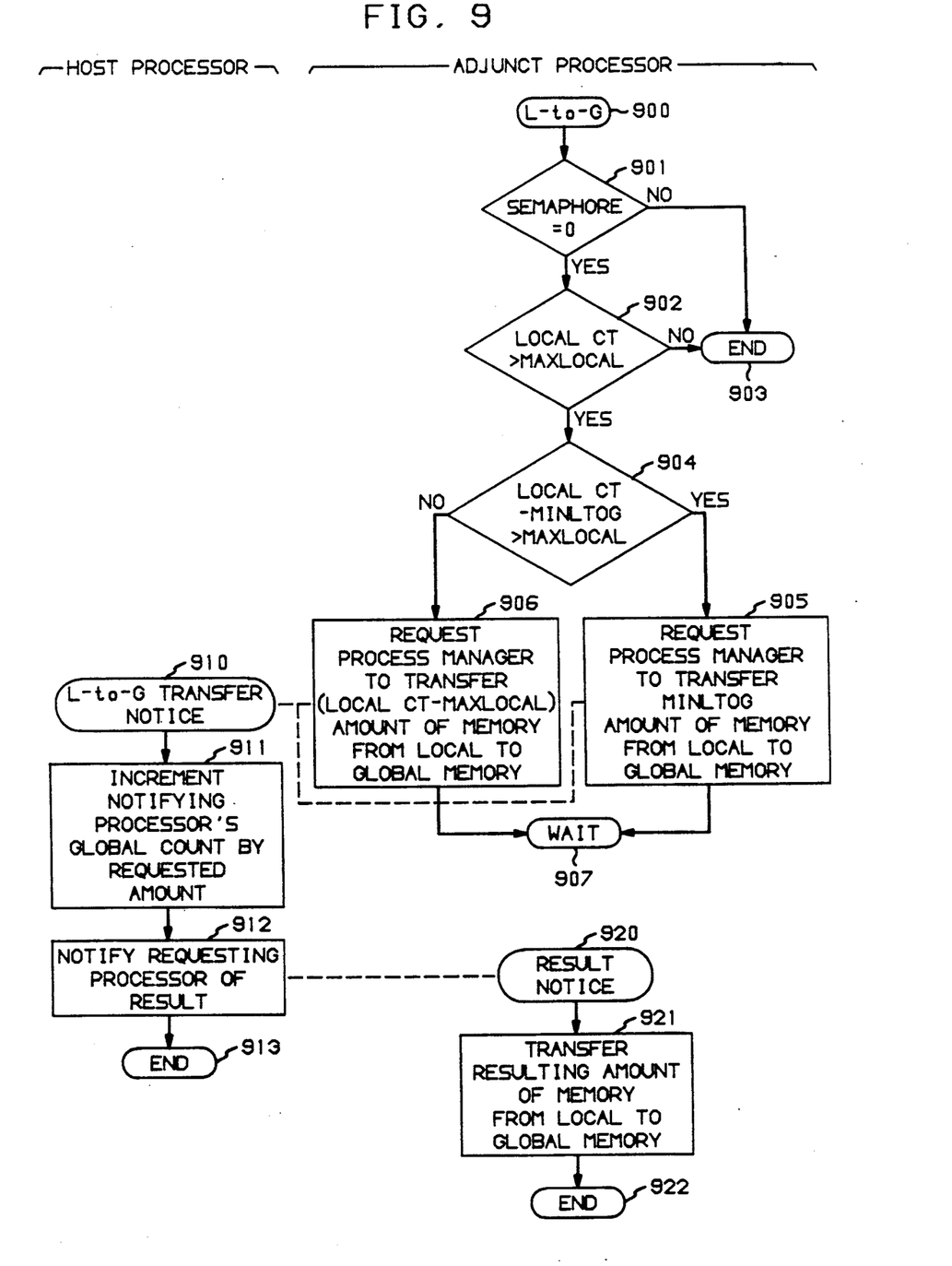
FIG. 9 is a flow diagram of local-to-global memory transfer function of the system of FIG. 1.

FIG. 9 shows the local-to-global (L-to-G) memory transfer function that is performed on each processor 11-12 periodically—illustratively once every second—or as part of a FORK or a deallocation call (see step 506 of FIG. 5 and step 804 of FIG. 8). The purpose of this function is to transfer excess uncommitted local memory 45 to global memory 42.

Assume that the L-to-G transfer function is being performed on processor 11. Upon commencing the function, at step 900, kernel 31 of processor 11 checks the value of counting semaphore 52 to determine whether local-to-global transfers are blocked, at step 901. If the value of semaphore 52 is not zero, it indicates that transfers are blocked, for example because a FORK or an EXEC call is in progress (see step 521 of FIG. 5 and step 651 of FIG. 6). Kernel 31 therefore ends the function, at step 903.

If the value of semaphore 52 is found to be zero at step 901, indicating that local-to-global transfers are not blocked, kernel 31 compares entry 202 of its tunable structure 51 with entry 206 to determine whether the size of uncommitted local memory 45 exceeds the MAXLOCAL size, at step 902. If the size of memory 45 is below the specified maximum, kernel 31 again ends the function of FIG. 9 without performing any transfers, at step 903.

If the size of memory 45 is found to exceed the specified maximum at step 902, kernel 31 checks entries 202, 206, and 207 of tunable structure 51 against each other to determine whether reducing size of uncommitted local memory 45 by the MINLTOG amount would bring it below the specified maximum, at step 904. If so, kernel 31 requests process manager 30 to transfer the MINLTOG amount of uncommitted local memory 45 to global memory 42, at step 905. If not, kernel 31 requests process manager 30 to transfer from uncommitted local memory 45 to global memory 42 that amount which will reduce the size of memory 45 to the specified maximum, at step 906. Kernel 31 illustratively places the request to memory manager 30 by means of causing a packet having information to that effect to be sent from processor 11 to processor 10 over bus 15. Following placing of the request with memory manager 30, kernel 31 awaits response therefrom, at step 907. Once again, the communication between processor 11 and processor 10 is kernel synchronous.

In response to receipt of the request, at step 910, process manager 30 increments entry 212 of global structure 50 by the amount specified in the request, at step 911, thereby initiating migration of memory from state 401 of FIG. 4 to state 400, represented by state transition 403. Process manager 30 then notifies kernel 31 of processor 11 of this result, at step 912, illustratively by sending an acknowledging packet to processor 11 over bus 15. Involvement of process manager 30 in the transfer then ends, at step 913.

In response to receiving from process manager 30 notice of the result of the request, at step 920, kernel 31 of processor 11 transfers the indicated amount of memory from uncommitted local memory 45 to global memory 42, at step 921, thereby completing the migration represented in FIG. 4 by state transition 403. Kernel 31 accomplishes the transfer by incrementing entry 201 of its tunable structure 51 by the indicated amount of memory, and decrementing entry 202 by the same amount. The local-to-global transfer then ends, at step 922.

Of course, it should be understood that various changes and modifications to the illustrative embodiment described above will be apparent to those skilled in the art. For example, a global-to-local memory transfer may be performed periodically to maintain the size of uncommitted local memory 45 at or above a predetermined minimum. Such changes and modifications can be made without departing from the spirit and the scope of the invention and without diminishing its attendant advantages. It is therefore intended that all such changes and modifications be covered by the following claims.

What is claimed is:

1. An apparatus comprising:
   a plurality of processors for executing processes, each having its own, non-shared, memory logically divided into a first and a second portion;
   first control means linked to the first memory portions for allocating memory included in the first memory portions to the processes; and
   a plurality of second control means, with a different one associated with each processor and linked to the associated processor's second memory portion, each for allocating memory included in the second memory portion of the associated processor to the processes.

2. The apparatus of claim 1 wherein:
   the first control means and the second control means of any processor include means for selectively transferring memory between the first and the second memory portion of the processor associated with the second control means.

3. The apparatus of claim 1 wherein
   the first portion of each processor's memory comprises a centrally-managed (global) memory portion, and
   the second portion of each processor's memory comprises a locally-managed (local) memory portion unallocated to process and a locally-managed (local) memory portion allocated to processes; wherein
   the first control means comprises
   means for assigning processes to the processors and further for transferring, for each assigned process, memory included in the global memory portion to the unallocated local memory portion of the processor to which the process is assigned; and wherein
   every second control means comprises
   means for transferring memory from the unallocated local memory portion of the allocated local memory portion of the associated processor, to allocate the transferred memory to processes assigned to the associated processor, and each further for transferring memory from the allocated local memory portion to the unallocated local memory portion of the associated processor, to deallocate the transferred memory from the processes assigned to the associated processor;
   the first control means and the second control means including means for transferring memory between the global memory portion and the unallocated local memory portion, both memory portions being of the processor associated with the second control means, in response to occurrence of predetermined conditions.

4. The apparatus of claim 1 wherein:
   the first control means includes means for assigning processes to the processors; and wherein
   each second control means includes means for allocating memory to processes assigned to the associated processor.

5. The apparatus of claim 1 wherein
   the first control means comprises
   means for assigning processes to the processors and further for transferring memory included in the first memory portion to the second memory portion for each assigned process, both portions being of the processor to which the process is assigned; and wherein
   each of the second control means comprises
   means for allocating memory included in the second memory portion to processes assigned to the associated processor.

6. An apparatus comprising:
   a plurality of processors for executing processes, each having its own, non-shared, memory logically divided into a first and a second portion;
   first control means linked to the first memory portions for allocating memory included in the first memory portions to the processes; and
   a plurality of second control means a different one associated with each processor and linked to the associated processor's second memory portion, each for allocating memory included in the second memory portion of the associated processor to the processes;
   the first control means and the second control means of any processor including means for selectively transferring memory between the first and the second memory portion of the processor associated with the second control means.

7. The apparatus of claim 6 wherein
   the first portion of each processor's memory comprises a centrally-managed (global) memory portion, and
   the second portion of each processor's memory comprises a locally-managed (local) memory portion unallocated to processes, and a locally-managed (local) memory portion allocated to processes; wherein
   the first control means comprises
   means for assigning processes to the processors and further for transferring, for each assigned process, memory included in the global memory portion to the unallocated local memory portion of the processor to which the process is assigned; and wherein
   every second control means comprises
   means for transferring memory from the unallocated local memory portion to the allocated local memory portion of the associated processor, to allocate the transferred memory to processes assigned to the associated processor, and each further for transferring memory from the allocated local memory portion to the unallocated local memory portion of the associated processor, to deallocate the transferred memory from processes assigned to the associated processor, where
   the means for transferring included in the first control means and the second control means transfer memory between the global memory portion and the unallocated local memory portion, both memory portions being of the processor associated with the second control means, in response to occurrence of predetermined conditions.

8. The apparatus of claim 6 wherein:
the first control means includes means for assigning processes to the processors; and wherein
each second control means includes means for allocating memory to processes assigned to the associated processor.

9. The apparatus of claim 6 wherein:
the first control means comprises
means for assigning processes to the processors and further for transferring memory included in the first memory portion to the second memory portion for each assigned process, both portions being of the processor to which the process is assigned; and wherein
each of the second control means comprises
means for allocating memory included in the second memory portion to processes assigned to the associated processor.

10. The apparatus of claim 6 wherein:
the transferring means included in the first control means and the second control means of any processor transfer memory between the first memory portion and the second memory portion of the processor associated with the second control means, in response to an amount of memory being included in the second portion and unallocated to the processes.

11. The apparatus of claim 6 wherein:
each second control means includes means for deallocating allocated memory from processes to the second memory portion of the associated processor.

12. The apparatus of claim 11 wherein:
the transferring means included in the first control means and the second control means of any processor transfer memory from the second memory portion to the first memory portion, both portions being of the processor associated with the cooperating second control means, when an amount of unallocated memory in the second memory portion exceeds a predetermined maximum, and further transfer memory from the first memory portion to the second memory portion when an amount of unallocated memory in the second memory portion subceeds a predetermined minimum.

13. An apparatus comprising:
a plurality of processors for executing processes, each having its own memory logically divided into a centrally-managed (global) memory portion, a locally-managed (local) memory portion unallocated to processes, and a locally-managed (local) memory portion allocated to processes;
first control means linked to the global memory portions for assigning processes to the processors and further for transferring, for each assigned process, memory included in the global memory portion to the unallocated local memory portion of the processor to which the process is assigned; and
a plurality of second control means, a different one associated with each processor and linked to the associated processor's local memory portions, and each for transferring memory from the unallocated local memory portion to the allocated local memory portion of the associated processor, to allocate the transferred memory to processes assigned to the associated processor, and each further for transferring memory from the allocated local memory portion to the unallocated local memory portion of the associated processor, to deallocate the transferred memory from processes assigned to the associated processor;
the first control means and the second control means including means for transferring memory between the global memory portion and the unallocated local memory portion, both memory portions being of the processor associated with the second control means, in response to occurrence of predetermined conditions.

14. The apparatus of claim 13 wherein:
the means for transferring included in the first control means and second control means transfer memory from the unallocated local memory portion to the global memory portion when an amount of memory in the unallocated local memory portion exceeds a predetermined maximum, and further transfer memory from the global memory portion to the unallocated local memory portion when an amount of memory in the unallocated local memory portion subceeds a predetermined minimum.

15. The apparatus of claim 13 wherein:
each memory is further logically partitioned into a plurality of parts; wherein
the first control means has first table means including a plurality of entries each associated with a different one of the plurality of processors and for storing a count of parts included in the global memory portion of the associated processor; wherein
each second control means has its own second table means including a first entry for storing a count of parts included in the global memory portion of the associated processor and a second entry for storing a count of parts included in the unallocated local memory portion of the associated processor; wherein
the means for transferring included in the first control means and the second control means of a processor transfer a number of parts of memory between the unallocated local memory portion and the global memory portion of the processor by means of either (a) incrementing and decrementing by the number the count stored by the second entry of the second table means, or (b) incrementing and decrementing by the number both the count stored by the first entry of the second table means and the count stored by that entry of the first table means which is associated with the processor associated with the second control means; and wherein
the second control means of the processor transfers a number of parts of memory between the unallocated local memory portion and the allocated local memory portion of the processor by either incrementing or decrementing by the number the count stored by the second entry of the second table means.

16. The apparatus of claim 13 wherein:
each second control means comprises
its own second table means including a first entry for storing an indication of an amount of memory included in the global memory portion of the associated processor and a second entry for storing an indication of an amount of memory included in the unallocated local memory portion of the associated processor, and operating system kernel means, responsive to a call for duplication of a process assigned to the processor associated with the second control means, for examining the first entry of the second table means to determine whether the global memory portion includes an amount of memory required by the duplicated process, and for requesting the first control means to allow the duplication if the global memory portion includes the required amount of memory; wherein the first control means comprises first table means including a plurality of entries each associated with a different one of the plurality of processors and for storing an indication of an amount of memory included in the global memory portion of the associated processor, and operating system process managing means, responsive to the request to allow the duplication, for examining the first table means' entry associated with the processor of the requesting second control means to determine whether the global memory portion of the processor includes the required amount of memory, and for both (a) decrementing the processor's associated entry in the first table means by the required amount to initiate transfer of the required amount of memory from the global memory portion top the unallocated local memory portion of the processor and (b) notifying the second control means of a grant of the request for duplication, if the global memory portion includes the required amount of memory; and the kernel means of the requesting second control means further responsive to the notice of the grant, for both (a) incrementing the second entry and decrementing the first entry of the second table means by the required amount to complete transfer of the required amount of memory from the global memory portion to the unallocated local memory portion, and (b) decrementing the second entry of the second table means by the required amount to transfer the required amount of memory from the unallocated local memory portion to the allocated local memory portion for allocation to the duplicated process.

17. The apparatus of claim 16 wherein:

the process managing means includes means for refusing the request for duplication, in response to determining that the global memory portion of the processor associated with the requesting second control means does not include the required amount of memory; and wherein the kernel means which is responding to a call for duplication includes means for failing the call for duplication in response to either (a) determining that the global memory portion does not include the amount of memory required by the duplicated process, or (b) refusal of the request for duplication.

18. The apparatus of claim 13 wherein:

the first control means comprises first table means including a plurality of entries each associated with a different one of the plurality of processors and for storing an indication of an amount of memory included in the global memory portion of the associated processor, and operating system process managing means, responsive to a call from a calling processor for transformation of a process, for selecting a processor for assignment to the transformed process, the selected processor being of the plurality of processors and having a global memory portion that includes an amount of memory required by the transformed process, and for both (a) decrementing the first table means' entry associated with the selected processor by the required amount to initiate transfer of the required amount of memory from the global memory portion to the unallocated local memory portion of the selected processor and (b) notifying the calling processor of the selection; and wherein each second control means comprises its own second table means including a first entry for storing an indication of an amount of memory in the global memory portion of the associated processor and a second entry for storing an indication of an amount of memory in the unallocated local memory portion of the associated processor, and operating system kernel means, responsive to notice from the calling processor of selection of the associated processor, for both (a) incrementing the second entry and decrementing the first entry of the second table means by the required amount to complete transfer of the required amount of memory from the global memory portion to the unallocated local memory portion, and (b) decrementing the second entry of the second table means by the required amount to transfer the required amount of memory from the unallocated local memory portion to the allocated local memory portion for allocation to the transformed process.

19. The apparatus of claim 18 wherein:

the process managing means includes means responsive to notice from the calling processor of failure of transformation of the process, for incrementing the first table means' entry associated with the selected processor by the required amount to terminate the initiated transfer of the required amount of memory from the global memory portion to the unallocated local memory portion.

20. The apparatus of claim 13 wherein:

each second control means comprises its own second table means including a first entry for storing an indication of an amount of memory in the global memory portion and a second entry for storing an indication of an amount of memory in the unallocated local memory portion, both memory portions being of the associated processor, and operating system kernel means, responsive to a call for allocation of a first amount of memory to a process assigned to the associated processor, for examining the second entry of the second table means to determine whether the unallocated local memory portion includes an amount of memory suitable to satisfy the call, for requesting the first control means to transfer a second amount of memory from the global memory portion to the local memory portion if the unallocated local memory portion does not include a suitable amount of memory, and for decrementing the second entry of the second table means by the first amount to transfer the first amount of memory from the unallocated local memory portion to the allocated local memory portion for allocation to the calling process, if the unallocated local memory portion includes a suitable amount of memory; and wherein the first control means comprises first table means including a plurality of entries each associated with a different one of the plurality of processors and for storing an indication of an amount of memory in the global memory portion of the associated processor, and operating system process manager means, responsive to the transfer request, for decrementing the first table means' entry associated with the processor of the requesting second control means by the smaller of the second amount and the full amount of memory in the global memory portion of the associated processor to initiate transfer of that smaller amount of memory from the global memory portion to the unallocated local memory portion, and notifying the requesting second control means of the result;

the kernel means of the requesting second control means further responsive to the notice for both incrementing the second entry and decrementing the first entry of the second table means by the amount being transferred to complete transfer of that amount of memory from the global memory portion to the unallocated local memory portion, for examining the second entry of the second table means to determine whether the unallocated local memory portion includes the first amount of memory, and for decrementing the second entry by the first amount to transfer the first amount of memory from the unallocated local memory portion to the allocated local memory portion for allocation to the calling process if the unallocated local memory portion includes the first amount of memory.

21. The apparatus of claim 13 wherein:

each second control means comprises its own second table means including a first entry for storing an indication of an amount of memory in the global memory portion of the associated processor, and a second entry for storing an indication of an amount of memory in the unallocated local memory portion of the associated processor, and operating system kernel means, responsive to a call for deallocation from a process assigned to the associated processor of a first amount of memory allocated thereto, for incrementing the second entry of the second table means by the first amount to transfer the first amount of memory from the allocated local memory portion to the unallocated local memory portion to deallocate the first amount of memory from the process, thereafter for examining the second entry of the second table means to determine whether the unallocated local memory portion includes an amount of memory in excess of a predetermined amount, and for requesting the first control means to transfer a second amount of memory from the local memory portion to the global memory portion if the unallocated local memory portion exceeds the predetermined amount of memory; and wherein the first control means comprises first table means including a plurality of entries each associated with a different one of the plurality of processors and for storing an indication of an amount of memory in the global memory portion of the associated processor, and operating system process managing means, responsive to the transfer request, for incrementing the first table means' entry associated with the processor of the requesting second control means by the second amount to initiate transfer of that amount of memory from the unallocated local memory portion to the global memory portion and notifying thereof the requesting second control means;

the kernel means of the requesting second control means further responsive to the notice, for both decrementing the second entry and incrementing the first entry of the second table means by the second amount to complete transfer of that amount of memory from the unallocated local memory portion to the global memory portion.

* * * * *